Patented Aug. 29, 1944

2,357,077

UNITED STATES PATENT OFFICE 2,357,077

ORGANIC PARASITICIDAL COMPOSITIONS

Kenneth R. Brown, Kennett Square, Pa., assignor to Atlas Powder Company, Wilmington, Del., a corporation of Delaware No Drawing. Application August 25, 1941, Serial No. 408,217

18 Claims. (Cl. 167—22)

The present invention is concerned with organic parasiticidal compositions.

An object of this invention is to provide parasiticidal compositions particularly effective against soft-bodied insects.

Another object is to provide parasiticidal compositions possessed of high differential toxicity towards soft-bodied insects, substantially harmless to higher animals under normal conditions of use, and capable of effective use at concentrations not injurious to plants.

Another object is to control insect infestations on plants by applying an aqueous spray of a toxic caprate ester.

A further object is to provide a rotenone-containing parasiticide exhibiting a high degree of effectiveness.

The above and other objects will become apparent in the course of the following specification.

As is known, the saturated, straight-chain monobasic fatty acids having even numbers of carbon atoms, from $C_4$ or butyric up to $C_{22}$, occur in nature as components of the triglycerides which compose the bulk of the vegetable and animal fats and oils. While the acids, in the form of pure or mixed glycerides, vary somewhat in digestibility, they are regarded as nontoxic to higher animals, but are not particularly toxic to insects.

Although the pure or mixed triglycerides such as tributyrin, tripalmitin, laurodipalmitin, and the like, are not effective as parasiticides, the combination of these food acids with polyhydric bodies in the form of partial esters yields compositions whose toxicity to higher animals is not significantly altered, but whose parasiticidal efficiency is much increased. Also, whereas the compositions obtained by esterifying fully various polyhydroxylic bodies with these food acids are ineffective in increasing the efficiency of rotenone, certain partial esters have a pronounced synergistic action with rotenone.

I have found that capric acid, in particular, may be combined with certain neutral polyhydroxy compounds, to give valuable parasiticides, having high differential toxicity for soft-bodied insects, and that these partial caprate esters are particularly efficacious in combination with rotenone or rotenone-containing extracts.

The substances which I contemplate using to form partial esters with capric acid are the low molecular weight neutral aliphatic polyhydroxylic organic compounds. By "low molecular weight" I mean to exclude compounds with molecular weights above those of the oligosaccharides. Typical members include the polyhydric alcohols, the external and internal ethers thereof, the reducing mono, di and oligosaccharides and lower alkyl glucosides thereof, nonreducing di and oligosaccharides, and the external ethers thereof with mono and polyhydric alcohols. As specific examples may be mentioned ethylene, propylene, and butylene glycol; glycerol; erythritol; pentaerythritol; pentitols; hexitols; desoxy hexitols, such as rhamnitol and 2-desoxy sorbitol; cyclitols such as inositol; sugars, such as glucose, sucrose, lactose and raffinose; external ether-alcohols, such as di and triethylene glycol, di, tri and higher polyglycerols; the various hydroxy alkyl polyhydric alcohols obtained by condensing polyhydric alcohols and sugars with ethylene oxide, propylene oxide, or glycidols; internal cyclic anhydrides such as the hexitans and hexides obtained by intramolecular loss of one and two mols of water respectively from the hexitols, sugar anhydrides such as laevo-glucosan; methylated derivatives such as quercitol, and quebrachitol; glucosides such as ethyl glucoside, and the like.

Of this group of polyhydroxylic compounds the preferred ones are those which have a ratio of carbon atoms to hydroxyl groups not greater than 3. Thus, glycerol has a ratio of 3:3 and a hexitan has a ratio of 6:4.

Among the partial capric esters the preferred ones are those wherein the ratio of fatty acid residue to hydroxyl groups does not exceed 1. Thus, glycerol monocaprate has a ratio 1:2, and mannitan monocaprate has a ratio 1:3. More particularly, I have found the mono-esters to be the most efficient for my purpose and, therefore, prefer them. Higher esters (di-, tri-, etc.) are useful, however, particularly in the case of the higher polyols having a large number of hydroxyl groups.

The capric acid may be obtained by the fractionation of the mixed fatty acids of capric-rich natural triglycerides, such as coconut or babassu oil, or from the oxidation of paraffine, and may contain minor amounts of higher fatty acids. Acids lower than $C_{10}$ should be substantially absent, due to their injurious effect on foliage.

The partial esters can be produced by known methods. The saccharides, their anhydrides and glucosides and the hexitols require, in general, the gentle low temperature acid-chloride-organic base procedure. The more heat resistant polyalcohols and ether alcohols can be reacted directly with the free fatty acid, with or without catalysts. For the preparation of hexitan and hexide esters it is generally convenient to start with the hexitol and carry out anhydride formation concurrently with esterification, using alkaline or acid catalysts to promote mono or dianhydride formation, respectively.

Also, mixed derivatives may be prepared by esterifying the fatty acid directly with a more reactive, heat stable polyol such as ethylene glycol or glycerol, to form a full ester, and then reacting with another polyol, usually in presence of an alkaline catalyst, to form a mixture of partial esters. Alternatively, the triglyceride may be isolated as such from a natural fat or oil by high-vacuum fractionation, or by crystallization, and then reacted under conditions to promote ester exchange, with the other polyol or mixtures thereof.

I have found that the most useful embodiments of my invention are the caprate mono-esters of mannitan or sorbitan, which esters may be obtained by reacting one mol of the hexitol with one mol of capric acid, with a basic catalyst, at temperatures of 220°–250° C., until the acid value is below 5. The reaction product is chiefly hexitan ester, with minor amounts of hexide monoester, hexitol ester and hexitan diester. The other by-product caprate mono- and di-esters have the desirable effect of lowering the titer of the product, and enhancing its dispersibility in water.

The hexitan monocaprates are the preferred esters because of their high insecticidal activity, lack of tendency to injure plants, and good water dispersibility. The esters of the lower polyols, such as ethylene glycol, diethylene glycol and glycerol, have good insecticidal properties but have a limited field of usefulness as they cannot be used on many varieties of plants because of their tendency to injure them. The esters of polyols higher than hexitans are mild in their action towards plants but are less efficient insecticides.

The partial caprate esters of my invention are especially suitable for use in water dispersion, in which form they are toxic to many common pests. Many of the esters have sufficient surface activity to be self-dispersible, and as a class they give aqueous emulsions of excellent spreading properties. These esters which are not self-dispersible can be dispersed by mechanical means or by the use of cheap emulsifying agents such as soap.

It will be understood by those skilled in the insecticidal art that the effectiveness and optimum effective dilution varies from one insect to another and from one compound to another. It may be stated, however, that these parasiticidal compositions are valuable in the control of many insects, and particularly soft-bodied insects such as aphids and the like. Likewise, the usefulness of a particular composition will depend in any specific case on the plant to be sprayed and its resistance to the ester under the spraying conditions.

By adding other toxic agents to my compositions, or to dispersions thereof, the specific effectiveness of both may be greatly increased. This permits of using greater dilution—with consequent lessening of any possible injury to foliage—and extends the range to more resistant varieties of parasites. Many toxic materials can be thus combined, such as pyrethrin concentrates, nicotine and its salts, arsenates, sulfur, various copper-containing mixtures, and the like.

I have found however that combinations of a very high degree of effectiveness are produced when a rotenone-containing toxic agent is added to a partial ester product of the type described above. The rotenone can be in the form of an extract of a botanical source, powdered derris or cube root, or other available source. This combination exhibits the effect of mutually increased toxicity or synergism. The combination is more toxic than the partial ester alone or the rotenone-containing product used with a conventional inert spreader. The amount of rotenone or rotenone-containing toxic agent that can be used with the partial esters of the invention is subject to variation as will be understood by those skilled in this art. The useful range is usually from about ½% to 3 or 4% of rotenone, based on the ester. About 1% rotenone is generally preferable.

The compositions of the invention can be made up and applied in accordance with usual commercial practice in dealing with insecticidal sprays. Combinations of the ester composition of the invention and other toxic agents such as rotenone can be prepared in advance by mixing the materials and then adding the mixture as a single ingredient when the spray is made up. This represents a highly convenient and satisfactory form of the combination of an ester according to the invention and another active ingredient.

The following examples illustrate comparative results using several compositions according to the invention. Red spider mite is generally accepted as a difficult insect to control but for this reason is a good example to bring out differences in performance that would not be apparent with less resistant insects.

*Example 1*

Red spider mites (*Tetranychus telarius*) on bean plants were sprayed with the following compositions, successive runs being made on active stages and eggs, with the results indicated.

| Ester | Dilution in water | Percent mortality | |
|---|---|---|---|
| | | Active stages | Egg stages |
| Ethylene glycol monocaprate [1] | 1:400 | 80.3 | 9.6 |
| Diethylene glycol monocaprate [1] | 1:400 | 91.2 | 3.7 |
| Sorbitan monocaprate | 1:400 | 94.5 and 71.3 | 37.8 |
| Mannitan monocaprate [1] | 1:200 | 97.7 | |
| Sorbitan monocaprate [1] | 1:200 | 95.4 | |

[1] Some plant injury noted. These spray compositions have high toxicity to the insect active stages but are unsuitable under the conditions of the experiment for use on bean plants.

*Example 2*

Red spider mites, active and egg stages on bean plants, were sprayed in successive runs with the following compositions, the results being as indicated.

| Ester | Dilution in water | Rotenone added (as derris extract) | Percent mortality | |
|---|---|---|---|---|
| | | | Active stages | Egg stages |
| | | Per cent | | |
| Mannitan monocaprate | 1:400 | 1 | 99.2 | 83.4 |
| Sorbitan monocaprate | 1:400 | 1 | 97.1 | 81.9 |
| Ethylene glycol monocaprate [1] | 1:400 | 1 | 97.1 | 14.4 |
| Diethylene glycol monocaprate [1] | 1:400 | 1 | 94.1 | 4.9 |
| Glycerol monocaprate | 1:400 | 1 | 99.6 | 52.8 |
| Polyglycerol monocaprate | 1:400 | 1 | 94.2 | 20.1 |
| Pentaerythritol monocaprate | 1:400 | 1 | 88.7 | 40.4 |

[1] Some plant injury noted. These compositions have high toxicity to the insects but are unsuitable under the conditions of the experiment for use on bean plants.

The spray compositions of Examples 1 and 2 were made up by simply mixing the esters and the water. In Example 2 the derris extract was mixed first with the ester and the mixture dispersed by stirring into water. In every case the compositions exhibited excellent wetting and spreading properties. The esters used were prepared by high temperature reactions of technical capric acid and the polyol, except in the case of the hexitans which were made from the hexitol and capric acid by an anhydridization-esterification reaction. The products of the reactions were not pure esters but consisted largely of the esters named together with other esters and/or unreacted materials as a result of the manner of their preparation.

The indication of plant injury in some of the experiments tabulated above does not constitute the particular esters inoperative as parasiticides generally, as will be understood by those skilled in this art. These parasiticides can be used on more resistant foliage or for parasiticidal applications where plants are not involved, as in control of mosquitoes, parasites on animals and the like.

The invention is not limited to use in the control of any single type of insect. While soft-bodied varieties are more readily affected by these esters many hard-bodied types can be controlled by their use, especially in the form of combinations with stomach poisons.

Many variations from the specific examples can be made and the invention is to be limited only by the scope of the following claims.

I claim:

1. A process for controlling insects which comprises applying to the insects an insecticide containing as an active ingredient a partial capric acid ester of a low molecular weight neutral aliphatic polyhydroxylic organic compound.

2. A process for controlling insects which comprises applying to the insects an insecticide containing as an active ingredient a partial capric acid ester of a low molecular weight neutral aliphatic organic polyhydroxylic compound, said polyhydroxylic compound having a ratio of carbon atoms to hydroxyl groups not greater than 3, and the said ester having a ratio of fatty acid residue to hydroxyl groups not exceeding 1.

3. A process as in claim 2 wherein the ester of the said insecticide is a monoester.

4. A process for controlling insects which comprises applying to the insects an insecticide containing as an active ingredient a hexitan partial ester of capric acid.

5. A process for controlling insects which comprises applying to the insects an insecticide containing as an active ingredient mannitan monocaprate.

6. A process for controlling insects which comprises applying to the insects an insecticide containing as an active ingredient sorbitan monocaprate.

7. A process for controlling insects which comprises applying to the insects an aqueous dispersion of a partial capric acid ester of a low molecular weight neutral aliphatic organic polyhydroxylic compound, said polyhydroxylic compound having a ratio of carbon atoms to hydroxyl groups not greater than 3, and the said ester having a ratio of fatty acid residue to hydroxyl groups not exceeding 1.

8. An insecticide containing as an active ingredient a synergistic mixture of rotenone and a partial capric acid ester of a low molecular weight neutral aliphatic polyhydroxylic organic compound.

9. An insecticide containing as an active ingredient a synergistic mixture of rotenone and a partial capric acid ester of a low molecular weight neutral aliphatic organic polyhydroxylic compound, said polyhydroxylic compound having a ratio of carbon atoms to hydroxyl groups not greater than 3, and the said ester having a ratio of fatty acid residue to hydroxyl groups not exceeding 1.

10. An insecticide as in claim 8 wherein the said ester is a monoester.

11. An insecticide comprising as an active ingredient a synergistic mixture of rotenone and a hexitan partial ester of capric acid.

12. An insecticide comprising as an active ingredient a synergistic mixture of rotenone and mannitan monocaprate.

13. An insecticide comprising as an active ingredient a synergistic mixture of rotenone and sorbitan monocaprate.

14. A process for controlling insect infestations on plants which comprises applying to the infested plants an aqueous dispersion of a partial capric acid ester of a low molecular weight neutral aliphatic polyhydroxylic organic compound.

15. A process for controlling insect infestations on plants which comprises applying to the infested plants an aqueous dispersion of a hexitan monocaprate.

16. A process for controlling insect infestations on plants which comprises applying to the infested plants an aqueous dispersion of a synergistic mixture of rotenone and a partial capric acid ester of a low molecular weight neutral aliphatic polyhydroxylic organic compound.

17. A process for controlling insect infestations on plants which comprises applying to the infested plants an aqueous dispersion of a synergistic mixture of rotenone and a hexitan monocaprate.

18. An insecticide containing as an active ingredient a mixture of a hexitan monocaprate and rotenone, said rotenone being present in the mixture as 1% based on the hexitan monocaprate.

KENNETH R. BROWN.